March 31, 1931.　　C. M. ANDERSON ET AL　　1,798,393
LAND ROLLER

Filed June 6, 1929

Inventors
Chas. M. Anderson
J. H. Cope

By　Emil F. Lange
Attorney

Patented Mar. 31, 1931

1,798,393

UNITED STATES PATENT OFFICE

CHARLES M. ANDERSON, OF HASTINGS, NEBRASKA, AND JOSEPH H. COPE, OF DENVER, COLORADO; SAID COPE ASSIGNOR TO SAID ANDERSON

LAND ROLLER

Application filed June 6, 1929. Serial No. 368,832.

Our invention relates to land rollers and its primary object is the provision of a land roller which will both pack and scarify the surface soil for making an ideal seed bed.

Another of our objects is the provision of a land roller having alternate soil packing discs and soil scarifying annuli so arranged that they are movable relative to each other so as to clear moist and sticky soil and trash from between them.

Another of our objects is the provision of a soil scarifying annulus which is so arranged in relation to the soil packing disc that it is always maintained in operative or working position.

Another object which we have in view is the provision of adjusting mechanism for regulating the relative working depth of the disc and soil scarifying annulus.

Another object is the provision of means connecting a soil packing disc to a soil scarifying annulus so that the annulus has free floating movement relative to the disc but so that it is compelled to make substantially as many revolutions as the disc makes.

Still another object is the provision of a soil packing disc and a soil scarifying annulus so dimensioned and positioned that either the one or the other may be made to work at a greater depth than the other.

Having in view these objects and others which will be pointed out in the following description, we will now refer to the drawings, in which Figure 1 is a view in isometric projection showing a battery of alternate soil packing discs and soil scarifying annuli, the annulus in the foreground being sectioned to more clearly disclose the relation between the annulus and the disc.

Figure 1:
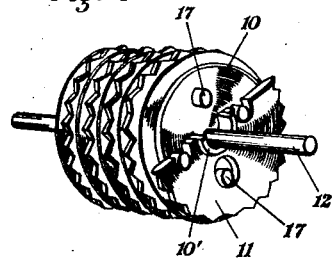

The roller as a whole includes a plurality of alternately arranged packing discs 10 and scarifying annuli 11 mounted on a shaft 12. The packing discs 10 are provided with bevel circumferential edges so that the ridge sinks into the soil, the disc being provided with an annular hub 10' surrounding the central aperture and projecting outwardly from the disc. The shaft 12 passes through central apertures in the packing discs 10, the apertures being of substantially the same diameter as that of the shaft 12. The scarifying annulus 11 is provided with a central aperture 13 which is appreciably larger in diameter than the annular hub 10' so that it has a floating movement on the shaft 12 relative to the packing disc 10. This loose connection of the scarifying annulus 11 on the hub 10' usually results in unequal rotation relative to the packing disc 10 and it also results in radial movements due to inequalities in the soil. The constant rubbing of the annulus on the disc usually keeps in motion all sticky soil and trash which packs on the periphery of the packer wheel and which creeps between the two and this motion of the annulus finally ejects the soil or trash.

Figure 4:
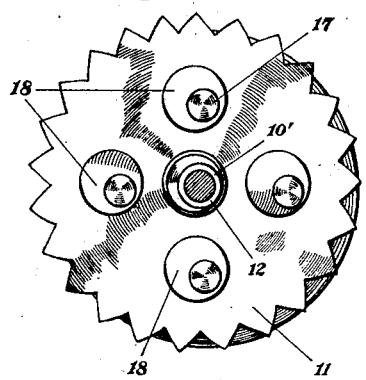
Figure 4 is a view in side elevation of a pair of units, the scarifying annulus being in the foreground.

As thus far described the structure is more or less common. In the practical working of the implement, however, numerous defects are found in the prior land rollers. In the prior constructions the scarifying annulus has the same diameter as that of the packing disc. The result is that in certain soil conditions the annulus will float above the surface of the soil without functioning to scarify the soil since it has only its own weight to carry it into the soil. In order to overcome this difficulty, we provide an annulus 11 having an appreciably larger external diameter than that of the packing disc 10. By this means the scarifier teeth may be forced to the same soil depth as that of the ridge of the packing disc as shown in Figure 4. This is due to the fact that the radial width of the annulus is equal to or greater than the radial distance from the hub 10′ to the ridge of the packing disc 10 the radial width being the distance between the inner and outer peripheries as measured on the radius. Any other arrangement would permit the annulus to rise to a point where the teeth would merely come in contact with the surface of the soil. During the operation of the land roller the scarifying annulus will not only be forced into the soil but it will work in the rear of the packing discs to mulch the rolled soil. As will be subsequently described, the scarifying annulus can be made to cut the soil at the depth of the rims of the packing discs or it may be adjusted to work at even a greater or less depth than the packing discs. Since they normally work in the rear of the packing discs, they can be made to thoroughly mulch the soil to any desired depth.

Figure 3:
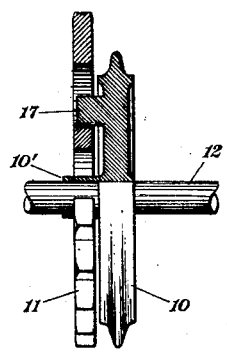
Figure 3 is a view, partly in edge elevation and partly in section, showing the relation between a disc and an annulus when assembled on the shaft.
Figure 5:
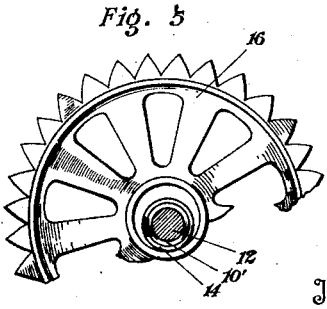
Figure 5 is a plan view of an annulus of somewhat modified construction, the view showing particularly the adjusting mechanism for regulating the relative working depths of the scarifier and packer discs.

The radial width of the annulus may be equal to the distance between the shaft and the ridge of the packing disc 10 in which case the working positions of the two members will be as shown in Figures 3 and 4. It is sometimes desirable, however, that the scarifier work at a greater or less depth than that of the packing disc. In such cases we provide collars 14 as shown in Figure 5 surrounding the shaft 12 which carries the scarifying annulus 16. By providing a sufficient number of collars 14 and in various sizes it is possible in a few moments time to insert collars of the proper size for giving the desired working depth to the teeth of the scarifier.

Figure 2:
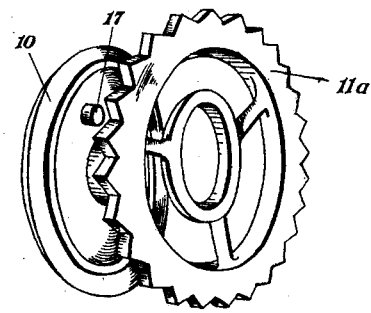
Figure 2 is a view in perspective of a single pair of the units shown in disassembled relation, the figure also showing a modified form of connection between the disc and the annulus.

As above described the collar 14 has the effect of increasing the diameter of the hub 10′. When the collar 14 is applied to the constructions as shown in Figures 3, 4 and 5, the scarifying annulus may be made to work at a greater depth than the packing disc 10. Occasions arise, however, when it is desired that the packing disc 10 work at a greater depth than the scarifying annulus. We therefore provide an annulus 11a as shown in Figure 2, the annulus having a hub of relatively large diameter so that the radial distance from the hub of the scarifying annulus to the periphery is less than the radial distance from the hub 10′ to the periphery of the packing disc. If this construction is used without collars, the scarifying annulus will have a tendency under certain soil conditions to work the soil at a level above that of the packing disc. By increasing the diameter of the hub 10′ by adding collars 14 of appropriate size, the working depth of the scarifying annulus 11a may be varied so as to be equal to, greater than or less than the working depth of the packing disc 10.

Under some soil conditions the prior rollers functioned only imperfectly, this being especially true when either the packing disc 10 or the scarifying annulus 11 were caused to stand still while the other member was rotated. It is essential that the scarifying annulus 11 have a floating relation on the shaft 12 but it is also important in some cases that the annulus 11 be compelled to make substantially as many revolutions as the disc 10 makes. In our construction this object is attained by providing the disc 10 with one or more laterally projecting pins 17 which enter one or more apertures 18 in the annulus. This construction permits relative radial movement between two members of the pair but it limits the relative arcuate movements of the two members of the pair within the range allowed by the pin 17 in the aperture 18. In the construction shown in Figures 3 and 4, the play of the pin 17 in an aperture 18 is substantially the same as that of the play of the shaft 12 in the aperture 13 but it is evident that this play may be made either greater or less. For example, in Figure 2 we show a modified form of scarifying annulus 11a having spokes, the spaces between the spokes allowing for the free movement of the pin 17 therein. In the Figure 2 construction the radial movement of the annulus 11a relative to the packing disc 10 is limited by the play of the hub 10′ within the central aperture of the scarifying disc 11a but the relative arcuate movement is limited by the play of the pin 17 between two spokes.

Figure 6:
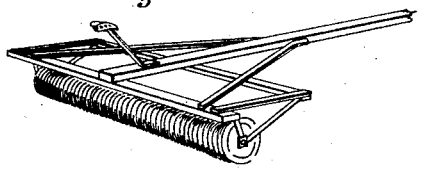
Figure 6 is a view in perspective drawn to a greatly reduced scale, showing a single roller and its frame.

The land rollers of the type described are designed to be mounted on the frame as shown in Figure 6 to be drawn by horses or tractors or any other suitable traction means. Figure 6 is merely illustrative of the general arrangement, but the most common constructions embodying a gang of any suitable number of land rollers so as to give the desired width.

Having thus described our invention in such full, clear, and exact terms that its construction and operation will be readily understood by others skilled in the art to which it pertains, what we claim as new and desire to secure by Letters Patent of the United States is:

1. In a land roller, a pair of contiguous soil working units each having a substantially circular outline, said units being secured together in a manner such that they have limited freedom of relative radial movement, and means for adjustably varying the limit of radial movement of said two units relative to each other.

2. In a land roller, a pair of contiguous soil working units each having a substantially circular outline, said units being secured together in a manner such that they have limited freedom of relative curvilinear and radial movement, and means for adjustably varying the limit of radial movement of said two units relative to each other.

3. In a land roller, a soil working disk having a central shaft, a soil working annulus surrounding said shaft, said annulus being contiguous to said disk, and means for adjustably spacing said annulus from said shaft.

4. In a land roller, a soil working disk having a central shaft, a soil working annulus surrounding said shaft, said annulus being contiguous to said disk, and adjusting means for causing said annulus and said disk to work the soil at the same depth or for causing either said annulus or said disk to work the soil at a greater depth than the other.

5. In combination, a soil working disk having a lateral projection of less diameter at one side thereof, said disk and said projection being coaxial, a soil working annulus contiguous to said disk and loosely surrounding said projection, the central aperture of said annulus being greater in diameter than said projection whereby said annulus will have rolling movement on said projection, and means for adjustably increasing or decreasing the diameter of said projection.

6. A land roller including a shaft and a pair of annular soil working members loosely mounted thereon whereby each of said members will have independent angular movement on said shaft, and connecting means between said two members for limiting the relative angular movements thereof.

7. In combination, a soil working disk having a lateral projection of less diameter at one side thereof, said disk and said projection being coaxial, a soil working annulus contiguous to said disk and loosely surrounding said projection, and means for limiting the relative angular movements of said disk and said annulus.

8. A land roller consisting of soil packing disks and soil scarifying annuli alternately positioned on a central shaft, the radial width of said annuli being not less than the radial distance between said shaft and the peripheries of said packing disks, the diameter of the central apertures of said annuli being greater than the diameter of said shaft, and the external diameters of said annuli being greater than the external diameter of said discs.

9. A land roller consisting of soil packing disks and soil scarifying annuli alternately positioned on a central shaft, hub members projecting laterally from said disks and surrounding said shaft, said annuli having a rolling movement on said hub members, the radial width of said annuli being not less than the radial distance between said shaft and the peripheries of said disks, the diameter of the central apertures of said annuli being greater than the diameter of said hub members and the external diameters of said annuli being greater than the external diameters of said discs.

In testimony whereof we affix our signatures.

CHARLES M. ANDERSON.
JOSEPH H. COPE.